R. EAMES.
CALIPERS.
APPLICATION FILED JUNE 13, 1919.

1,328,651. Patented Jan. 20, 1920.

Inventor
Robert Eames,
By
Attorneys

UNITED STATES PATENT OFFICE.

ROBERT EAMES, OF DETROIT, MICHIGAN.

CALIPERS.

1,328,651.

Specification of Letters Patent. Patented Jan. 20, 1920.

Application filed June 13, 1919. Serial No. 303,882.

*To all whom it may concern:*

Be it known that I, ROBERT EAMES, a subject of the King of Great Britain, residing at Detroit, in the county of Wayne and State of Michigan, have invented certain new and useful Improvements in Calipers, of which the following is a specification, reference being had therein to the accompanying drawings.

The primary object of my invention is to furnish a pair of calipers, dividers, compasses or similar instruments with novel means for easily and quickly ascertaining measurements made with the instrument and thus insure accuracy, obviate the necessity of using a scale or rule, and facilitate the use of such instrument.

Another object of my invention is to provide an improvement that may be in the form of an attachment applicable to instruments now in use, or it may be embodied in an instrument at the time of manufacture. In either instance, provision is made to compensate for wear and the nature of the improvement is such as not to interfere with the usual manipulation of the instrument.

Figure 1:
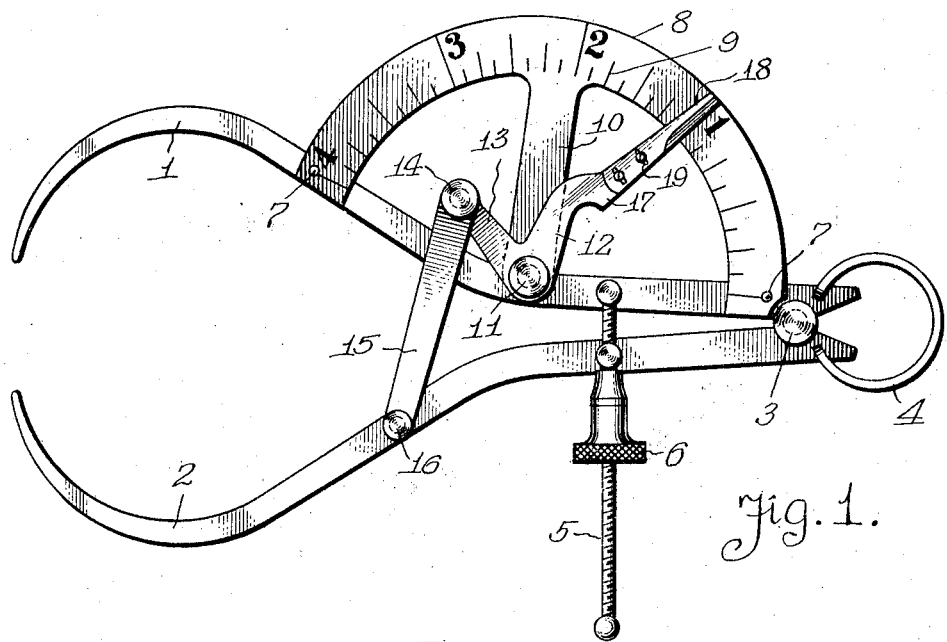
Figure 2:
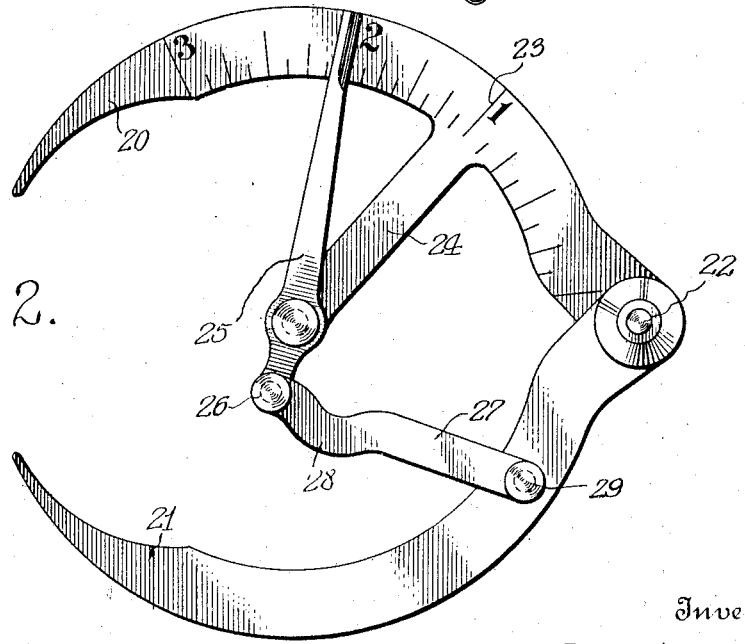

A further object of my invention is to accomplish the above result by a simple, durable and inexpensive mechanical construction that will be hereinafter specifically described and then claimed, and reference will now be had to the drawings, wherein Figure 1 is a side elevation of an outside spring caliper provided with the improvement, and Fig. 2 is a similar view of another form of outside caliper provided with the improvement.

As set forth in the beginning, my invention is applicable to calipers, either for inside or outside measurements, and in Fig. 1 the reference numerals 1 and 2 denote caliper legs pivotally or hingedly connected together in the usual manner, as at 3, with the inner ends of the legs connected by an expansion spring 4 which is normally held under tension by a pivoted screw-threaded rod 5, carried by the leg 1, and a nut 6 on said rod against the leg 2. By adjusting the nut 6 the legs 1 and 2 may be adjusted relative to each other and this is the construction found in a conventional form of caliper.

Attached to the leg 1, by rivets 7 or other fastening means is a flat segment shaped member 8 which has the face thereof provided with large graduations 9 and these graduations may be more closely assembled at or adjacent the ends of the member 8 than on the central portion thereof.

Intermediate the ends of the member 8 is a support 10 in the same plane as the member 8 and extending to the leg 1 of the caliper where it pivotally supports, as at 11, a bell crank 12, said bell crank having its short arm 13 pivotally connected, as at 14, to a link 15, and said link is pivotally connected as 16 to the leg 2 of the caliper. The long arm of the bell crank 12 terminates in a pointer or hand 17 that extends over or on to the calibrated face of the member 8.

To compensate for wear between the measuring ends of the legs 1 and 2 the pointer or hand 17 of the bell crank 12 may be provided with an adjustable plate 18, said plate being adjustably held on the face of the pointer or hand, as at 19, so that the edge of the plate may be advanced over the edge of the pointer or hand and thus insure accuracy of the pointer or hand relative to the measuring ends of the legs 1 and 2.

The calipers shown in Fig. 2 comprises legs 20 and 21 having the inner ends thereof frictionally connected by a suitable pivot 22, so that the legs 20 and 21 may be manually adjusted. The leg 20 is graduated, as at 23 and provided with an integral support 24 on the end of which is pivoted a bell crank 25 having its short arm pivotally connected, as at 26, to a link 27, said link being offset, as at 28 to provide clearance for the end of the support 24. The link 27 is pivotally connected, as at 28, to the leg 21 and the long arm of the bell crank 25 terminates in a pointer or hand extending over or on to the graduated face of the leg 20.

In either instance of my invention movement of the caliper leg causes the pointer or hand to be shifted relative to the graduations of the instrument and it is possible for an artisan to quickly determine the distance between the outer ends of the caliper 8 or any other measurement made by a similar instrument.

It is thought that the utility of my invention will be apparent without further description, and while in the drawing there are illustrated the preferred embodiments of my invention, it is to be understood that the structural elements are susceptible to such variations and modifications as fall within the scope of the appended claim.

What I claim is:—

An instrument comprising adjustable legs, a bell crank pivotally supported relative to one of said legs and terminating in a pointer movable over said leg and a link connecting the short arm of said bell crank to the other leg so as to move said bell crank when said legs are adjusted relative to each other.

In testimony whereof I affix my signature in the presence of two witnesses.

ROBERT EAMES.

Witnesses:
 KARL H. BUTLER,
 ANNA M. DORR.